US012798768B2

(12) United States Patent
Johnson et al.

(10) Patent No.: US 12,798,768 B2
(45) Date of Patent: Nov. 17, 2026

(54) SYSTEM AND METHOD FOR LANDING GEAR EXTENSION AND RETRACTION

(71) Applicant: Airbus Operations Limited, Filton (GB)

(72) Inventors: Mark Johnson, Filton (GB); Jason Shorto, Filton (GB); Peter Davis, Filton (GB)

(73) Assignee: Airbus Operations Limited, Filton Bristol (GB)

( * ) Notice: Subject to any disclaimer, the term of this patent is extended or adjusted under 35 U.S.C. 154(b) by 108 days.

(21) Appl. No.: 18/754,424

(22) Filed: Jun. 26, 2024

(65) Prior Publication Data

US 2025/0002141 A1 Jan. 2, 2025

(30) Foreign Application Priority Data

Jun. 29, 2023 (GB) ..................................... 2309903

(51) Int. Cl.
*B64C 25/30* (2006.01)
*B64C 25/22* (2006.01)
*B64C 25/24* (2006.01)

(52) U.S. Cl.
CPC .............. *B64C 25/30* (2013.01); *B64C 25/22* (2013.01); *B64C 25/24* (2013.01)

(58) Field of Classification Search
CPC ......... B64C 25/30; B64C 25/22; B64C 25/24; B64C 13/16; B64C 13/18; B64D 45/04
See application file for complete search history.

(56) References Cited

U.S. PATENT DOCUMENTS 2,769,601 A * 11/1956 Hagopian ............ G05D 1/0022 246/187 A
4,573,649 A * 3/1986 Yourkowski ............ B64C 25/30 244/102 R
6,507,776 B1 1/2003 Fox, III
8,180,503 B2 5/2012 Estabrook et al.
10,426,393 B2 10/2019 Bosworth et al.
(Continued)

FOREIGN PATENT DOCUMENTS

BR 112018071549 B1 * 8/2023

OTHER PUBLICATIONS

United Kingdom Search Report for corresponding United Kingdom Patent Application No. 2309903.9 dated Dec. 20, 2023.

*Primary Examiner* — Donald J Wallace
*Assistant Examiner* — Jalal C Coduroglu
(74) *Attorney, Agent, or Firm* — Greer, Burns & Crain, Ltd.

(57) ABSTRACT

An aircraft has a landing gear that can be extended and retracted and a landing gear control system that is configured so that it can cause extension/retraction of the landing gear of the aircraft in response to pilot operation of a landing gear lever. The control system is also configured such that in the scenario of pilot incapacitation, it can cause extension/retraction of the landing gear of the aircraft in response to an automated command for landing gear extension/retraction. A kit of parts including a relaying unit can be used for converting an existing aircraft to one that has this functionality. There is also a method of automatically extending/retracting landing gear, for example in the event of pilot incapacitation when performing single-pilot operation of the aircraft.

7 Claims, 10 Drawing Sheets

(56) References Cited

U.S. PATENT DOCUMENTS

| | | | | |
|---|---|---|---|---|
| 2009/0187293 | A1* | 7/2009 | Trotter | B64C 25/26 701/16 |
| 2009/0319104 | A1 | 12/2009 | Bailly et al. | |
| 2015/0151832 | A1* | 6/2015 | Filho | B64C 25/22 244/102 R |
| 2015/0291278 | A1* | 10/2015 | Allwein | B64C 25/34 244/102 A |
| 2019/0090800 | A1* | 3/2019 | Bosworth | A61B 5/0015 |
| 2020/0262588 | A1* | 8/2020 | Nakhjavani | B64C 25/14 |
| 2020/0277044 | A1* | 9/2020 | Kerr | B64C 25/28 |
| 2020/0331587 | A1* | 10/2020 | L'Allier | B64C 25/26 |
| 2021/0287560 | A1 | 9/2021 | Mast et al. | |
| 2023/0144801 | A1* | 5/2023 | Pankok | G05D 1/0688 701/14 |
| 2023/0382519 | A1* | 11/2023 | Lappos | B64C 25/28 |

* cited by examiner

SYSTEM AND METHOD FOR LANDING GEAR EXTENSION AND RETRACTION

CROSS-REFERENCES TO RELATED APPLICATIONS

This application claims the benefit of the United Kingdom patent application No. 2309903.9 filed on Jun. 29, 2023, the entire disclosures of which are incorporated herein by way of reference.

FIELD OF THE INVENTION

The present disclosure concerns an aircraft comprising a control system for landing gear extension and retraction and a related method. The disclosure also concerns a kit of parts suitable for converting an existing aircraft into an aircraft comprising such a control system. The disclosure also concerns a method of converting an existing aircraft into an aircraft comprising such a control system.

The subject matter of the present disclosure has particular application in relation to large commercial passenger or freight aircraft, but may have application in relation to other types of aircraft having one or more landing gear assemblies which are arranged to extend (for example, to be deployed) and to retract.

BACKGROUND OF THE INVENTION

Landing gear extension and retraction is typically commanded by a pilot of the aircraft operating a switch or lever in the cockpit/flight deck. It may therefore be desirable for the aircraft to be provided with safety systems to cope with the possibility of the pilot or pilots being incapacitated during operation of the aircraft.

Systems have been proposed in the prior art for automatic extension and/or retraction of landing gear in the event of pilot incapacitation. U.S. Pat. No. 10,426,393 describes a pilot health monitoring system configured to determine a health condition of the pilot and provide commands as a function of the information. US 2009/0319104 describes a system for guiding and piloting an aircraft in case of inability of the pilots. U.S. Pat. No. 8,180,503 describes an assisted flight computer program and method, which assist a non-pilot or partially incapacitated pilot to gain control of an aircraft and land the aircraft. U.S. Pat. No. 6,507,776 describes an autopilot for an aircraft having an automatic descent function in the event of cabin depressurization. US 2021/0287560 describes systems and methods providing assist-to-land and emergency land functions. US 2009/0187293 describes an electrically activated aircraft landing gear control system and method. Those systems typically require complicated installation and/or manufacturing techniques and/or may not be readily adopted by airlines or be considered as sufficiently practical for wide adoption, if the changes perceivable by flight crew (or maintenance crew) to existing, established and/or legacy systems are too great.

The present invention seeks to provide an aircraft comprising an improved control system for extending and/or retracting a landing gear of the aircraft and/or improved related methods.

SUMMARY OF THE INVENTION

The present invention provides, according to a first aspect, an aircraft including an extendible landing gear, and a landing gear control system. The landing gear control system comprises a landing gear control unit, a pilot operated landing gear input device (e.g., a landing gear lever), and a first relaying unit. The landing gear control system is configured to extend the landing gear of the aircraft in response to pilot operation of the pilot operated landing gear input device. Pilot operation of the landing gear input device causes a command to be sent to the first relaying unit and passed from the relaying unit to the landing gear control unit, which then causes the landing gear to be extended. The landing gear control system is also configured to extend the landing gear of the aircraft when incapacitation of the pilot of the aircraft is detected. During use, in embodiments of the invention, when pilot incapacitation is detected a command is sent to the first relaying unit which is then passed on by the first relaying unit to the landing gear control unit, which then causes the landing gear to be extended. In embodiments, the provision of a relaying unit which is able both to relay a command issued by pilot operation of the landing gear input device and to relay automatically a command in the event of pilot incapacitation when the landing gear needs to be extended, enables an aircraft to be suitable for single pilot operations and for an existing aircraft to be readily converted for such single pilot operations, as will be explained in further detail below.

The landing gear control unit may comprise a computer processing unit. The first relaying unit may comprise a circuit. The first relaying unit may be an electronic device with the functionality to relay commands. The first relaying unit may be a circuit having an OR gate (e.g., arranged to output a signal/command which then causes the landing gear to be extended, if the OR gate receives a signal indicating pilot operation of the pilot operated landing gear input device OR a signal indicating incapacitation of the pilot and the need to extend the landing gear). The first relaying unit may be implemented, at least partly, in software within the landing gear control system of the aircraft. The pilot operated landing gear input device is typically provided in the cockpit/flight deck of the aircraft for operation by the pilot and may be a lever. In alternative embodiments, the pilot operated landing gear input device may be a switch, a button or the like. The pilot operated landing gear input device may comprise one input device (such as a button) for issuing a gear-up command and another input device for issuing a gear-down command. The landing gear control system of the aircraft may be a set of electronic devices that manage the extension and retraction of the landing gear of the aircraft, for example using a series of control loops. The landing gear control system may be a part of other systems of the aircraft.

Pilot incapacitation may be detected by other systems on-board the aircraft, for example with the use of an on-board computer. Pilot incapacitation may be detected with the use of one or more sensors positioned within the cockpit/flight deck of the aircraft. Such sensors may, for example, continuously monitor health indicators of the pilot, such as heart rate and eye movement. Data from sensors within the cockpit/flight deck may be analyzed by an on-board computer of the aircraft and used to determine that pilot incapacitation has occurred. The aircraft may enter an emergency auto-pilot state when pilot incapacitation is detected. Other systems on board the aircraft, preferably an on-board computer, may detect pilot incapacitation and output the command for landing gear extension to the first relaying unit.

During operation of certain embodiments of the invention, the aircraft may be operated by a single pilot of the aircraft (i.e., one person being in command of the aircraft with no other person authorized and available on the aircraft to take on the responsibility of being in command of the aircraft). During such single pilot operation, it may be that pilot incapacitation is detected and systems on board the aircraft determine that landing gear extension is required. In these circumstances, a command is sent to the first relaying unit and passed from the relaying unit to the landing gear control unit, which then causes the landing gear to be extended. This automated extension of the landing gear, enables the landing gear to be extended even when the single pilot is incapacitated and unable to operate the pilot operated landing gear input device. It may be that having a relaying unit incorporated within the landing gear control system of the aircraft allows this functionality to be provided on an aircraft without the existing landing gear control system of the aircraft requiring significant alteration. This reduces the cost of retrofitting certain aircraft with this functionality. In addition, since the relaying unit does not require significant alterations to the cockpit/flight deck of an existing aircraft in order to provide this functionality, the need for additional pilot training is significantly diminished. The first relaying unit may have been retrofitted to an existing landing gear control system of the aircraft.

The landing gear control system may be configured to retract the landing gear of the aircraft in response to pilot operation of the pilot operated landing gear input device. Pilot operation of the pilot operated landing gear input device may cause a command to be sent to the first relaying unit and passed from the relaying unit to the landing gear control unit which then causes the landing gear to be retracted. The landing gear control system may be configured to retract the landing gear of the aircraft when incapacitation of the pilot of the aircraft is detected, in response to a command sent to the first relaying unit and passed from the first relaying unit to the landing gear control unit which then causes the landing gear to be retracted.

During operation of certain embodiments of the invention, pilot incapacitation is detected and systems on board the aircraft determine that landing gear retraction is required. In these circumstances, a command is sent to the first relaying unit and passed from the relaying unit to the landing gear control unit, which then causes the landing gear to be retracted. This automated retraction of the landing gear, enables the landing gear to be retracted even when the pilot is incapacitated and unable to operate the pilot operated landing gear input device.

The aircraft may include a primary landing gear extension and retraction system (e.g., a hydraulic landing gear extension and retraction system). The aircraft may include a freefall landing gear extension system, for example to provide redundancy and/or to cater for a failure in the primary landing gear extension and retraction system. Such a freefall landing gear extension system may be referred to as an alternate landing gear extension system and/or a secondary landing gear extension system. The freefall landing gear extension system may include an electric motor, for example to assist in causing the landing gear to extend. The landing gear control system may include a second relaying unit. The landing gear control system may include a pilot operated freefall landing gear input device. The freefall landing gear extension system may be configured to extend the landing gear of the aircraft using the electric motor in response to pilot operation of the pilot operated freefall landing gear input device. The freefall landing gear extension system may be configured to extend the landing gear of the aircraft using the electric motor when both incapacitation of the pilot of the aircraft is detected and a fault with the primary (e.g., hydraulic) system is detected. The freefall landing gear extension system may be configured to extend the landing gear of the aircraft using the electric motor in response to a command sent to the second relaying unit and passed from the second relaying unit to the freefall landing gear extension system.

The primary/hydraulic landing gear extension and retraction system may be separate from the secondary/freefall landing gear extension system. The freefall landing gear extension system may provide a backup mechanism for extension of the landing gear in the event that the primary/hydraulic landing gear extension and retraction system experiences a failure. The primary/hydraulic landing gear extension and retraction system may be controlled by a separate signal feed to the freefall landing gear extension system.

The electric motor may be configured to allow the landing gear of the aircraft to extend. The electric motor may be a component that has been retrofitted to an existing aircraft with an existing freefall landing gear extension system. For example, the existing aircraft may include a mechanism (e.g., a mechanical control such as a crank wheel, installed in the cockpit, which when operated drives a series of linkages and valves to release and extend the landing gear and associated landing gear doors) configured to be manually operated/moved by a pilot to cause the landing gear to extend in its alternate freefall mode. The electric motor may have been retrofitted to an existing aircraft in order to convert the existing freefall landing gear extension system of the existing aircraft so that the freefall landing gear extension system can be controlled electronically. The electric motor may allow the freefall landing gear extension system to be operated electronically or "by-wire" rather than just by pilot operated mechanical controls. This may provide a benefit in that pilot workload may, for example, be reduced such that in the event of pilot incapacitation or inability of the pilot to operate a mechanical control, the freefall landing gear extension system may be operated by electronic signals.

The pilot operated freefall landing gear input device may be provided in the cockpit/flight deck of the aircraft for operation by the pilot and may be a lever, a switch, or a button.

The second relaying unit may be separate from the first relaying unit. The second relaying unit may comprise a circuit. The second relaying unit may be an electronic device with the functionality to relay commands. The second relaying unit may be a circuit having an OR gate (e.g., arranged to output a signal/command which then causes the landing gear to be extended, if the OR gate receives a command/signal indicating pilot operation of the pilot operated freefall landing gear input device OR it receives a command/signal indicating incapacitation of the pilot, a fault with the primary/hydraulic system, and a need to extend the landing gear). The second relaying unit may be implemented in software within the landing gear control system of the aircraft. The second relaying unit may be integrated into the freefall landing gear extension system. The second relaying unit may be connected to the pilot operated freefall landing gear input device via a signal feed. The second relaying unit may be connected to the freefall landing gear extension system via a signal feed. The second relaying unit may be connected to the electric motor via a signal feed.

The electric motor may be in the form of a prime mover. The electric motor may be an actuator. A fault with the hydraulic landing gear extension and retraction system may be detected by sensors on the landing gear of the aircraft. A fault with the hydraulic landing gear extension and retraction system may be detected by sensors within a hydraulic mechanism of the aircraft. A fault with the hydraulic landing gear extension and retraction system may be detected by a computer on-board the aircraft. A computer on-board the aircraft may determine that there is a fault with the hydraulic landing gear extension and retraction system if extension/retraction of the landing gear fails to occur within a certain time after extension/retraction of the landing gear is commanded.

The second relaying unit may have been retrofitted to an existing landing gear control system of the aircraft. The second relaying unit may allow the freefall landing gear extension system to be operated electronically or "by-wire" rather than just by pilot operated mechanical controls. This may provide a benefit of reduced pilot workload such that in the event of pilot incapacitation or inability of the pilot to operate a mechanical control, the freefall landing gear extension system may be operated by electronic signals passed to the electric motor by the second relaying unit.

The aircraft may be a passenger aircraft. The aircraft may be a freight aircraft. The aircraft is preferably one that is specifically configured for single-pilot operations. The aircraft may have a capacity of at least 20, more preferably at least 50 passengers, and more preferably more than 50 passengers. The aircraft may be a commercial aircraft, for example a commercial passenger aircraft, for example a single aisle or twin aisle aircraft. For the purposes of the present specification, the term commercial passenger aircraft also covers aircraft of an equivalent size configured for cargo and/or used on a non-commercial basis. The aircraft may have a maximum take-off weight (MTOW) of at least 20 tons, optionally at least 40 tons, and possibly 50 tons or more. The aircraft may have an operating empty weight of at least 20 tons, optionally at least 30 tons, and possibly about 40 tons or more.

An aircraft of the present disclosure will typically include one or more landing gear assemblies controlled by the landing gear control system of the aircraft. The aircraft may include a nose landing gear (NLG) assembly and one or more main landing gear (MLG) assemblies.

The present invention provides, according to a second aspect, an aircraft including an extendible landing gear; a pilot operated freefall landing gear input device; and a freefall landing gear system that includes an electric motor. The freefall landing gear system is configured to extend the landing gear of the aircraft using the electric motor in response to pilot operation of the pilot operated freefall landing gear input device causing a gear-down command to be sent to the electric motor.

The pilot operated freefall landing gear input device may be provided in the cockpit/flight deck of the aircraft for operation by the pilot and may be a switch, a lever, a button or the like.

The electric motor may be in the form of a prime mover. The electric motor may be an actuator. The electric motor may be configured to allow the landing gear of the aircraft to extend (for example, allowing the landing gear of the aircraft to extend). The electric motor may be a component that has been retrofitted to an existing aircraft with an existing freefall landing gear extension system. The electric motor may have been retrofitted to an existing aircraft in order to convert the existing freefall landing gear extension system of the existing aircraft so that the freefall landing gear extension system can be controlled electronically. The electric motor may allow the freefall landing gear extension system to be operated electronically or "by-wire" rather than just by pilot operated mechanical controls. This may provide a benefit in that in the event of pilot incapacitation or inability of the pilot to operate a mechanical control, the freefall landing gear extension system may be operated by electronic signals. The electric motor may be provided in the cockpit/flight deck, for example to move a mechanism that would previously have been moved manually by a pilot to cause the landing gear to extend in a freefall mode, as an alternative to deployment under the power of a hydraulic systems The aircraft may comprise a relaying unit. The freefall landing gear system may also be configured to extend the landing gear of the aircraft using the electric motor when incapacitation of the pilot of the aircraft is detected, in response to a command sent to the relaying unit and passed from the relaying unit to the electric motor.

The relaying unit may comprise a circuit. The relaying unit may be an electronic device with the functionality to relay commands. The relaying unit may be a circuit having an OR gate (e.g., arranged to output a signal/command which then causes the landing gear to be extended, if the OR gate receives a command/signal indicating pilot operation of the pilot operated freefall landing gear input device OR it receives a command/signal indicating incapacitation of the pilot, a fault with a primary/hydraulic landing gear system of the aircraft, and the need to extend the landing gear). The relaying unit may be implemented, at least partly, in software within a landing gear control system of the aircraft.

Pilot incapacitation may be detected by other systems on-board the aircraft, for example with the use of an on-board computer. Pilot incapacitation may be detected with the use of one or more sensors positioned within the cockpit/flight deck of the aircraft. Such sensors may, for example, continuously monitor health indicators of the pilot, such as heart rate and eye movement. Data from sensors within the cockpit/flight deck may be analyzed by an on-board computer of the aircraft and used to determine that pilot incapacitation has occurred. The aircraft may enter an emergency auto-pilot state when pilot incapacitation is detected. Other systems on board the aircraft, preferably an on-board computer, may detect pilot incapacitation and output the command for landing gear extension to the relaying unit.

The present invention provides, according to a third aspect, a kit of parts including a relaying unit, for converting an existing aircraft that is configured only to extend or retract a landing gear in response to pilot operated controls, to an aircraft in accordance with the first aspect of the invention. The kit of parts may include an electric motor. The kit of parts may include a pilot operated freefall landing gear input device. The kit of parts may include a second relaying unit. The kit of parts may be configured for converting an existing manually operated freefall landing gear extension system of the existing aircraft.

The kit of parts may include a computer program product for programming an existing system on the aircraft to perform one or more steps of a method of extending/retracting the landing gear of an aircraft in accordance with the invention as claimed or described herein.

The present invention provides, according to a fourth aspect, a kit of parts including an electric motor and a pilot operated freefall landing gear input device, for converting an existing aircraft with a manually operated freefall landing gear extension system, to an aircraft in accordance with the second aspect of the invention.

The kit of parts may include a computer program product for programming an existing system on the aircraft to perform one or more steps of a method of extending/ retracting the landing gear of an aircraft in accordance with the invention as claimed or described herein.

The present invention also provides a method of automatically extending landing gear on an aircraft. The method may be performed on an aircraft as described or claimed herein, for example. The method may comprise one or more steps as now described. As a first step, the method comprises receiving a signal indicating pilot incapacitation. As a second step, the method comprises receiving a signal indicating that landing gear extension is required. As a third step, preferably in response to the first and second steps, the method comprises outputting a signal to a first relaying unit to command extension of the landing gear. As a fourth step, preferably in response to the signal commanding extension of the landing gear, the method comprises the first relaying unit outputting a gear-down command signal. As a fifth step, preferably in response to the gear-down command signal, the method comprises the aircraft extending the landing gear. The step of the aircraft extending the landing gear may comprise the gear-down command signal being received by a hydraulic landing gear system. The step of the aircraft extending the landing gear may also comprise the hydraulic landing gear extension system extending the landing gear of the aircraft.

The step of the aircraft extending the landing gear may comprise receiving a signal indicating a fault with a hydraulic landing gear extension system of the aircraft, and in response outputting a signal to a second relaying unit to command the extension of the landing gear. The step of the aircraft extending the landing gear may comprise in response to the signal commanding extension of the landing gear, the second relaying unit outputting a gear-down command to a freefall landing gear extension system of the aircraft, and the freefall landing gear extension system extending the landing gear of the aircraft.

It may be that a computer of the aircraft receives the signal indicating pilot incapacitation. For example, the computer may receive one or more signals from one or more sensors that together enable the computer to deem that there is pilot incapacitation. It may be that a computer of the aircraft receives the signal indicating that landing gear extension is required. For example, the computer may receive one or more signals from one or more sensors (including, for example, an indication of altitude and/or flight phase) that together enable the computer to deem that landing gear extension is required. It may be that a computer of the aircraft outputs the signal to the first relaying unit to command extension of landing gear. It may be that a landing gear control unit receives the gear-down command signal from the first relaying unit and controls the hydraulic landing gear system to extend the landing gear of the aircraft.

It may be that a computer of the aircraft receives the signal indicating a fault with a primary/hydraulic landing gear extension system of the aircraft. It may be that a computer of the aircraft outputs a signal to the second relaying unit to command the extension of the landing gear in response to the signal indicating a fault with the a primary/hydraulic landing gear extension system of the aircraft.

It may be that pilot incapacitation is detected through the use of one or more sensors which are configured to monitor the health of the pilot. During performance of the method, it may be that there is only a single pilot present in the cockpit/flight deck of the aircraft.

The step of outputting a signal to a first relaying unit to command extension of the landing gear may comprise outputting a first signal to the first relaying unit and outputting a second signal to the first relaying unit. The step of the first relaying unit outputting a gear-down command signal may only occur once the first relaying unit has received both the first signal and the second signal. The requirement of receiving both a first signal and a second signal (e.g., both a COM and a MON signal—i.e., as in a command/monitor system) before initiating an action, such as gear-down, can prevent a single false command from causing an action to be initiated unnecessarily.

The step of outputting a signal to a second relaying unit to command the extension of the landing gear may comprises outputting a primary signal to the second relaying unit; and outputting a secondary signal to the second relaying unit. The step of the second relaying unit outputting a gear-down command to the freefall landing gear extension system of the aircraft may only occur once the second relaying unit has received both the primary signal and the secondary signal (e.g., in a similar manner to the COM/MON example set out above).

The present invention provides, according to a further aspect, a method of automatically extending landing gear on an aircraft. The method may be performed on an aircraft as described or claimed herein, for example. The method may comprise one or more steps as now described. As a first step, the method comprises receiving a signal indicating pilot incapacitation. As a second step, the method comprises receiving a signal indicating that landing gear extension is required. As a third step, in response to the first and second steps, the method comprises outputting a signal to command extension of the landing gear. As a fourth step, in response to the signal commanding extension of the landing gear, the method comprises a freefall landing gear extension system of the aircraft extending the landing gear of the aircraft.

The present invention provides, according to a yet further aspect, a method of automatically retracting landing gear on an aircraft. The method may be performed on an aircraft as described or claimed herein, for example. The method may comprise one or more steps as now described. As a first step, the method comprises receiving a signal indicating pilot incapacitation. As a second step, the method comprises receiving a signal indicating that landing gear retraction is required. As a third step, in response to the first and second steps, the method comprises outputting a signal to a first relaying unit to command retraction of the landing gear. As a fourth step, in response to the signal commanding retraction of the landing gear, the method comprises the first relaying unit outputting a gear-up command signal. As a fifth step, in response to the gear-up command signal, the method comprises the aircraft retracting the landing gear. It will be appreciated that various aspects of the embodiments/invention that relate to the extension of the landing gear are applicable to the retraction of the landing gear (and can therefore optionally be applied mutatis mutandis).

The present invention also provides a method of converting an existing aircraft. In embodiments, the existing aircraft comprises an extendible landing gear, a computer, and a landing gear control system. The landing gear control system of the existing aircraft preferably comprises a landing gear control unit, and a pilot operated landing gear input device. The existing aircraft is configured to extend or retract its landing gear in response to pilot operation of the pilot operated landing gear input device. The method comprises the step of integrating a first relaying unit on the aircraft, for example into the landing gear control system. The step of integrating the first relaying unit may comprise providing a signal feed from the pilot operated landing gear input device to the first relaying unit. The step of integrating the first relaying unit may comprise providing a signal feed from the computer to the first relaying unit. The step of integrating the first relaying unit may comprise providing a signal feed from the first relaying unit to the landing gear control unit.

The computer may be part of other systems on-board the existing aircraft. The step of integrating the first relaying unit may comprise implementing the first relaying unit, at least partly, in software within the landing gear control system of the aircraft.

The step of providing a signal feed from the computer to the first relaying unit may comprise providing a primary signal feed from the computer to the first relaying unit, and providing a secondary signal feed from the computer to the first relaying unit (e.g., as a COM/MON arrangement).

The method of converting an existing aircraft may further comprise integrating a second relaying unit into the landing gear control system. The method of converting an existing aircraft may further comprise replacing a manually operated freefall landing gear extension mechanism on the existing aircraft with an electrically driven freefall landing gear extension mechanism.

The step of replacing a manually operated freefall landing gear extension mechanism on an existing aircraft with an electrically driven freefall landing gear extension mechanism may further comprise replacing a mechanical pilot operated freefall input device in the cockpit/flight deck of the aircraft with an electronic switch, a button or a lever. The step of replacing a manually operated freefall landing gear extension mechanism on an existing aircraft with an electrically driven freefall landing gear extension mechanism may further comprise integrating a motor into the freefall landing gear extension mechanism of the aircraft such that the motor is configured to operate the freefall landing gear extension mechanism.

The step of integrating the second relaying unit may comprise providing a signal feed from the computer to the second relaying unit. The step of integrating the second relaying unit may comprise providing a signal feed from a pilot operated freefall landing gear input device in the cockpit/flight deck of the aircraft to the second relaying unit. The step of integrating the second relaying unit may comprise providing a signal feed from the second relaying unit to the freefall landing gear extension mechanism of the aircraft.

The step of integrating a second relaying unit may further comprise implementing the second relaying unit, at least partly, in software within the landing gear control system of the aircraft.

The present invention also provides a relaying unit for an aircraft having a retractable landing gear. The relaying unit is configured, when fitted in an aircraft, to receive commands for landing gear extension/retraction from a pilot input device. The relaying unit is configured, when fitted in an aircraft, to receive commands for landing gear extension/retraction from other systems on board the aircraft. In response to receiving a command for landing gear extension/retraction, the relaying unit is configured to output a command for landing gear extension/retraction to a landing gear system of the aircraft, causing the landing gear of the aircraft to extend/retract. The relaying unit may be configured to be retrofitted into a control system of an existing aircraft to form a retrofitted aircraft. The control system of the existing aircraft may be configured only to receive commands for landing gear extension/retraction from a pilot input device. The control system of the retrofitted aircraft may be configured to receive commands for landing gear extension/retraction from both a pilot input device and from other systems on board the aircraft.

It will be appreciated that at least some of the steps of the method(s) described above and/or claimed herein may be performed in a different order than presented, may overlap in time and/or may be performed simultaneously.

It will of course be appreciated that features described in relation to one aspect of the present invention may be incorporated into other aspects of the present invention. For example, the method of the invention may incorporate any of the features described with reference to the apparatus of the invention and vice versa.

BRIEF DESCRIPTION OF THE DRAWINGS

Embodiments of the present invention will now be described by way of example only with reference to the accompanying schematic drawings of which.

DETAILED DESCRIPTION OF THE PREFERRED EMBODIMENTS

Figure 1:
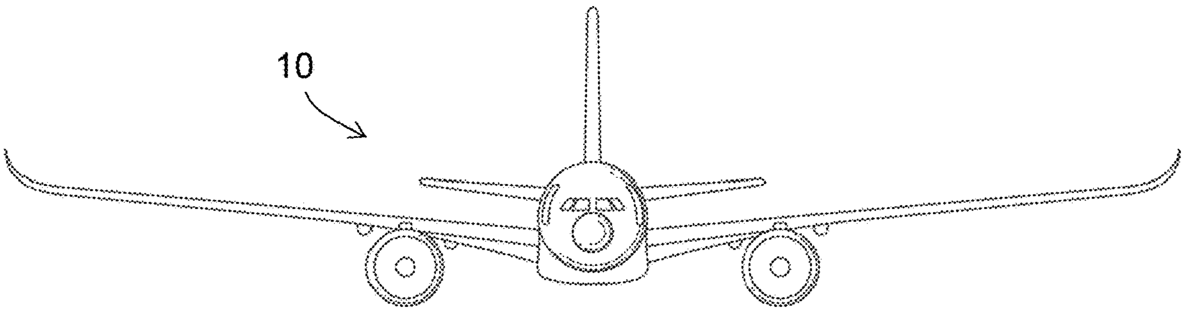
FIGS. 1 and 2 show an aircraft with its nose landing gear and main landing gear assemblies in a retracted position.
Figure 2:
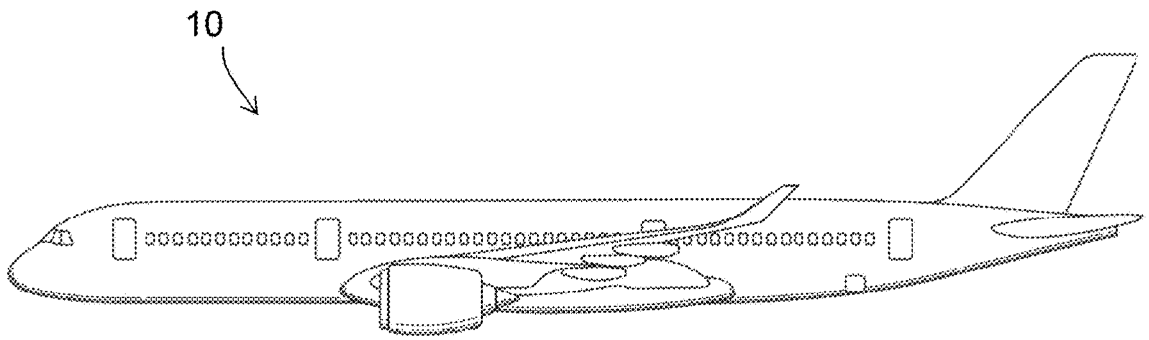
Figure 3:
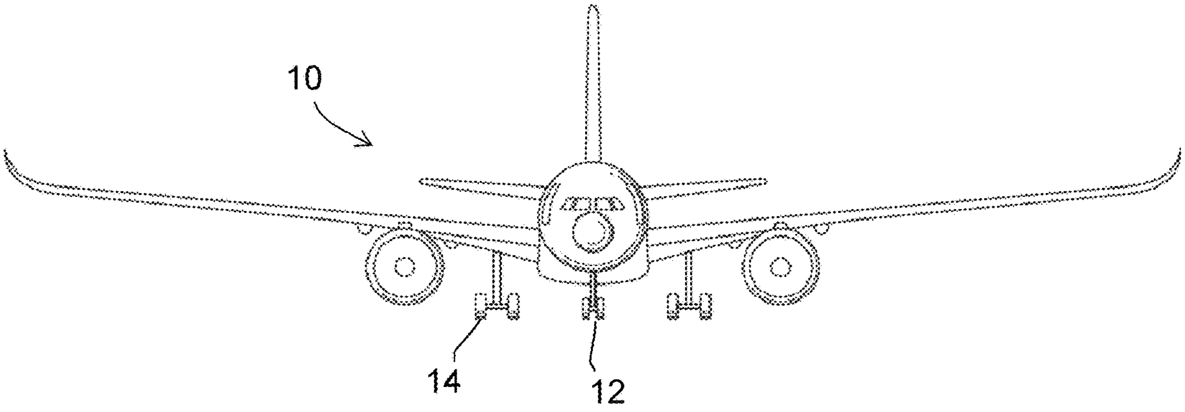
FIGS. 3 and 4 show the same aircraft with its nose landing gear and main landing gear assemblies in an extended position.
Figure 4:
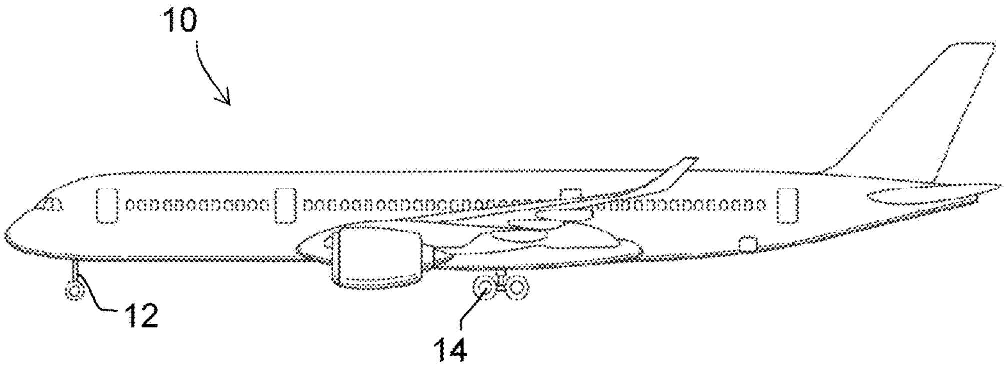

Embodiments of the present invention relate to the retraction and extension of a landing gear on an aircraft, for example when operated by a single pilot, so that there is an adequate and easily implemented back-up system to cope with the possibility of pilot incapacitation. Such an aircraft is shown in FIGS. 1 to 4. FIGS. 1 and 2 show the aircraft 10 with its nose landing gear (NLG) and main landing gear (MLG) in the retracted position (i.e., stowed). FIGS. 3 and 4 show the same aircraft 10 with its NLG 12 and MLG 14 in the extended position (i.e., deployed).

Figure 5:
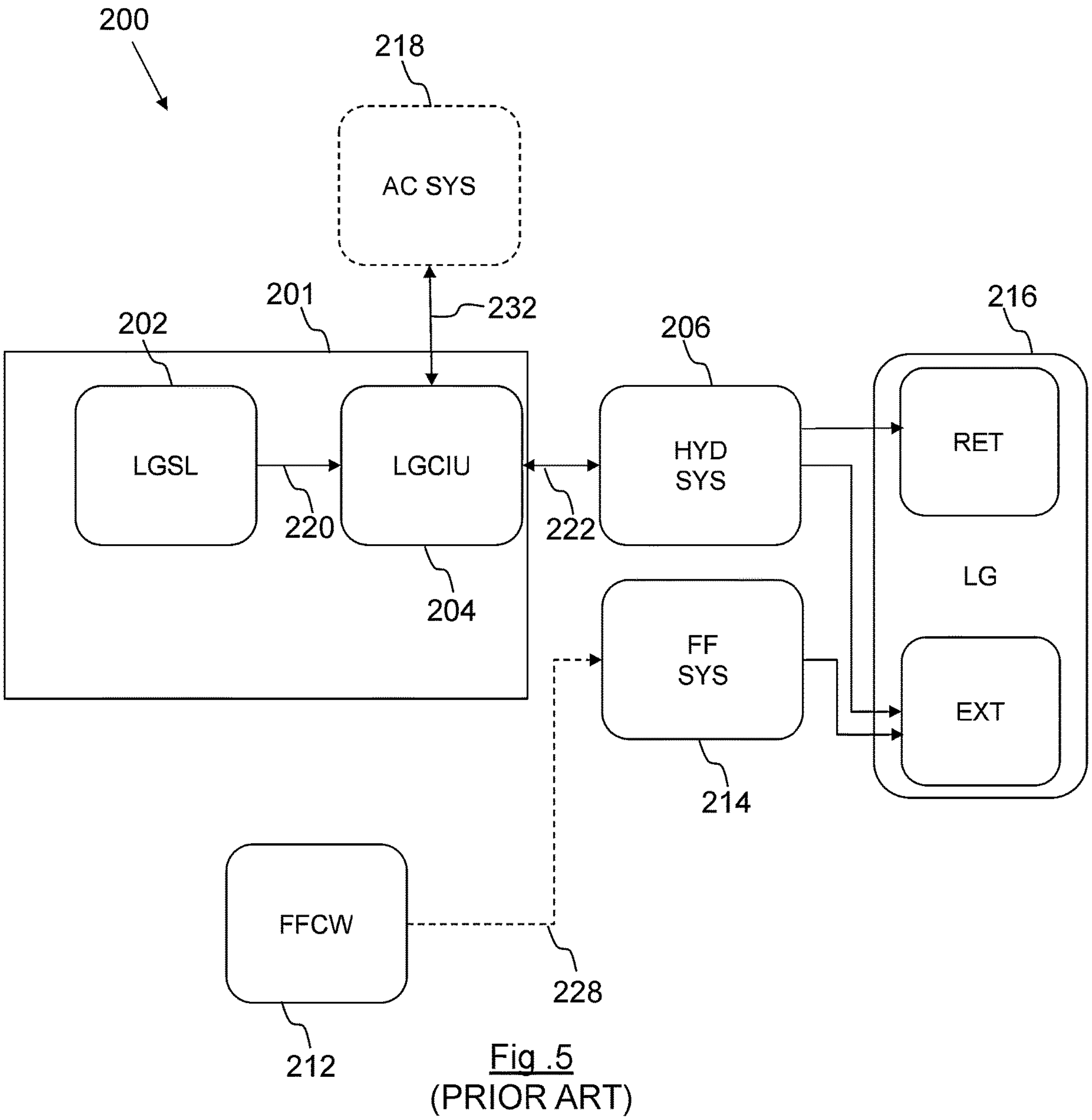
Fig .5 (PRIOR ART)
FIG. 5 shows an apparatus for use within an existing aircraft of the prior art.

FIG. 5 shows an apparatus 200 for use within an aircraft of the prior art. The apparatus 200 includes a landing gear control system 201 for retracting (and also extending) a landing gear 216 in accordance with the prior art. The landing gear control system 201 comprises a landing gear control indicator unit (LGCIU) 204, a landing gear selector lever (LGSL) 202 and a free-fall landing gear crank wheel (FFCW) 212. The apparatus 200 also comprises retractable landing gear 216, a hydraulic landing gear system 206, a free-fall landing gear system 214 and various signal feeds including a signal feed 232 to and from other aircraft systems 218. The LGCIU 204 is configured to output, on receipt of a command (via signal feed 220) for landing gear extension from the LGSL 202, a gear-down command (via signal feed 222) to the hydraulic landing gear system 206. On receipt of the gear-down command the hydraulic landing gear system 206 is configured to perform a sequence of steps for extending the landing gear 216 and moving the associated landing gear doors to allow for deployment of the landing gear 216. The pilot of the aircraft is able to cause a command for landing gear extension to be sent, by operating the landing gear selector lever LGSL 202.

The LGCIU 204 is configured to output, on receipt of a command (via signal feed 220) for landing gear retraction from the LGSL 202, a gear-up command (via signal feed 222) to the hydraulic landing gear system 206. On receipt of the gear-up command the hydraulic landing gear system 206 is configured to perform a sequence of steps for retracting the landing gear 216 (and moving the associated doors appropriately). The pilot of the aircraft is able to cause a command for landing gear retraction to be sent by operating the LGSL 202.

There is also an alternative means of extending the landing gear which does not rely on hydraulic power, but gravity alone (freefall extension). Thus, the pilot of the aircraft is additionally able to cause extension of the landing gear by means of a free-fall landing gear system 214 by operating the free-fall landing gear crank wheel (FFCW) 212 (the action on the free-fall landing gear system 214 being represented in FIG. 5 by broken line 228). Operation of the crank wheel (FFCW) 212, which is installed in the cockpit, drives a series of linkages and valves to release and extend the landing gear and associated landing gear doors. The pilot would only operate the FFCW 212 in a scenario where retraction of the landing gear by the hydraulic landing gear system 206 has failed.

Figure 6:
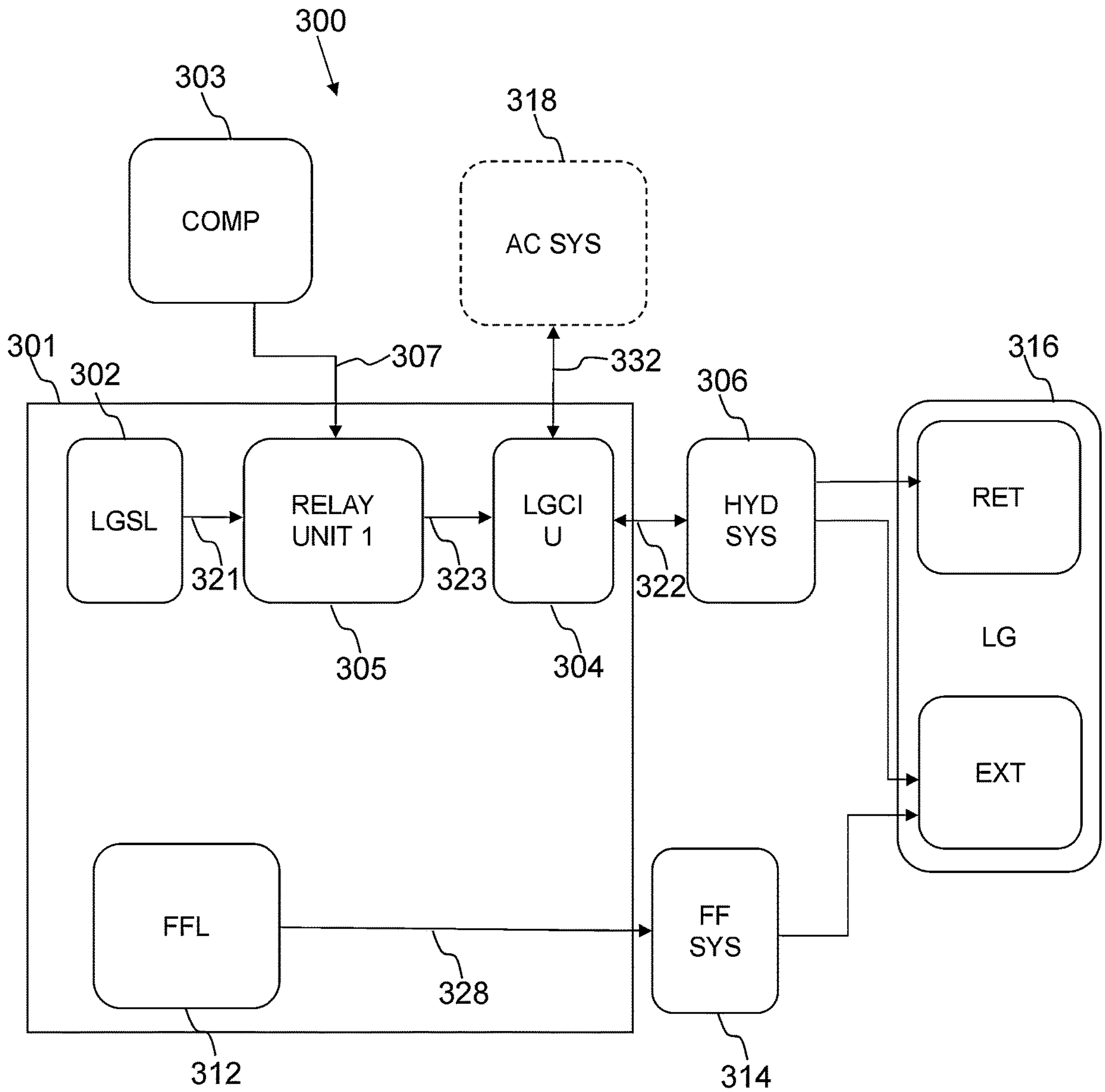
FIG. 6 shows an apparatus for use within an aircraft according to a first embodiment.

FIG. 6 shows an apparatus 300 for use within an aircraft according to a first embodiment of the present invention, particularly suited for single pilot operation of the aircraft. The apparatus 300 includes a landing gear control system 301 for retracting (and also extending) a landing gear 316. The landing gear control system 301 comprises a landing gear control indicator unit (LGCIU) 304, a landing gear selector lever (LGSL) 302, a free-fall landing gear selector lever (FFL) 312 and a first relaying unit 305. The apparatus 300 also comprises retractable landing gear 316, a hydraulic landing gear system 306 (primary system for extending the landing gear), a free-fall landing gear system 314 (secondary/alternate system for extending the landing gear), a computer 303 connected by signal feed 307 to the first relaying unit 305 and various signal feeds including a signal feed 332 to and from other aircraft systems 318 (such as sensors for detecting altitude of the aircraft). The LGCIU 304 is configured to output, on receipt of a command (via signal feed 323) for landing gear extension/retraction from the first relaying unit 305, a gear-down/gear-up command (via signal feed 322) to the hydraulic landing gear system 306. On receipt of the gear-down/gear-up command the hydraulic landing gear system 306 is configured to perform a sequence of steps for extending/retracting the landing gear 316. The first relaying unit 305 is configured to output a command for landing gear extension/retraction to the LGCIU 304 in response to the pilot of the aircraft operating the LGSL 302 (which sends a signal via signal feed 321). The first relaying unit 305 is also configured to output a command for landing gear extension/retraction to the LGCIU 304 in response to the computer 303 outputting a command for landing gear extension/retraction via signal feed 307. The computer 303 is configured to output a command for landing gear extension/retraction when it is detected that landing gear extension/retraction is required and pilot incapacitation has occurred.

In embodiments, pilot incapacitation is detected through the use of one or more sensors which are configured to monitor the health of the pilot.

The pilot of the aircraft is able to cause a command for landing gear extension to be sent to the free-fall landing gear system 314 (via signal feed 328) by operating the free-fall landing gear selector lever (FFL) 312. The pilot would only operate the FFL 312 in a scenario where the primary system has failed (e.g., extension of the landing gear by the hydraulic landing gear system 306 has failed).

Figure 7:
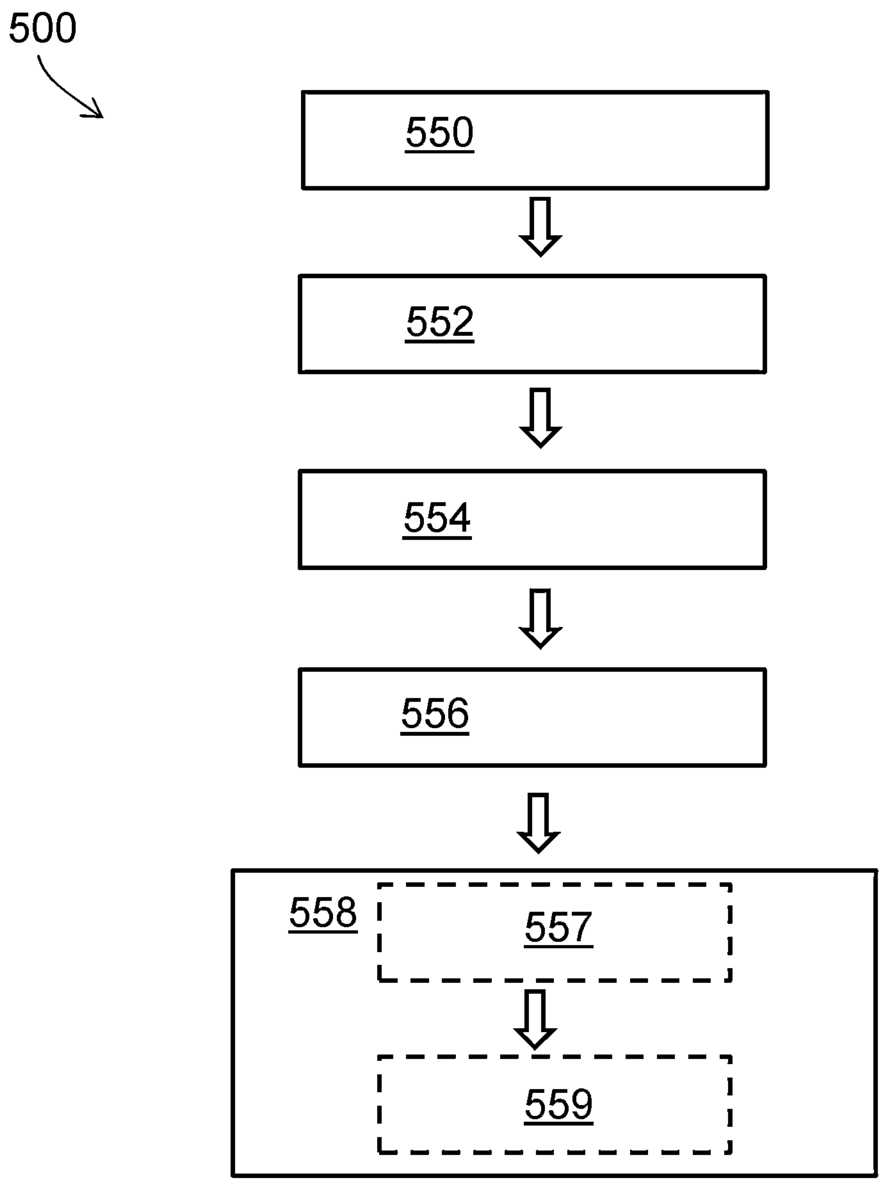
FIG. 7 shows a series of steps of a method that is performed when extending/retracting the landing gear of an aircraft having an apparatus in accordance with the first embodiment.

FIG. 7 shows a sequence of method steps 500 that are performed when extending/retracting the landing gear of an aircraft having an apparatus in accordance with the first embodiment. The aircraft is in single-pilot operation mode. The method has particular application in the event of the single pilot being incapacitated. As a first step 550, the computer receives one or more signals indicating that pilot incapacitation has occurred or the computer detects pilot incapacitation. As a second step, 552, the computer receives one or more signals indicating that landing gear extension/retraction is required or the computer detects that landing gear extension/retraction is required. Then, as a third step 554, in response to the first and second steps, the computer outputs a signal to the first relaying unit to command extension/retraction of the landing gear. As a fourth step 556, in response to the signal commanding extension/retraction of the landing gear, the first relaying unit outputs a gear-down/gear-up command signal. Then as a fifth step 558, in response to the gear-down/gear-up command signal, the landing gear of the aircraft is extended/retracted.

In embodiments, the fifth step 558 of the landing gear of the aircraft being extended/retracted in response to the gear-down/gear-up command signal comprises two intermediary steps. As a first intermediary step 557, the gear-down/gear-up command signal is received by a hydraulic landing gear system of the aircraft. As a second intermediary step 559, the hydraulic landing gear system extends/retracts the landing gear of the aircraft in response to the first intermediary step 557.

Figure 8:
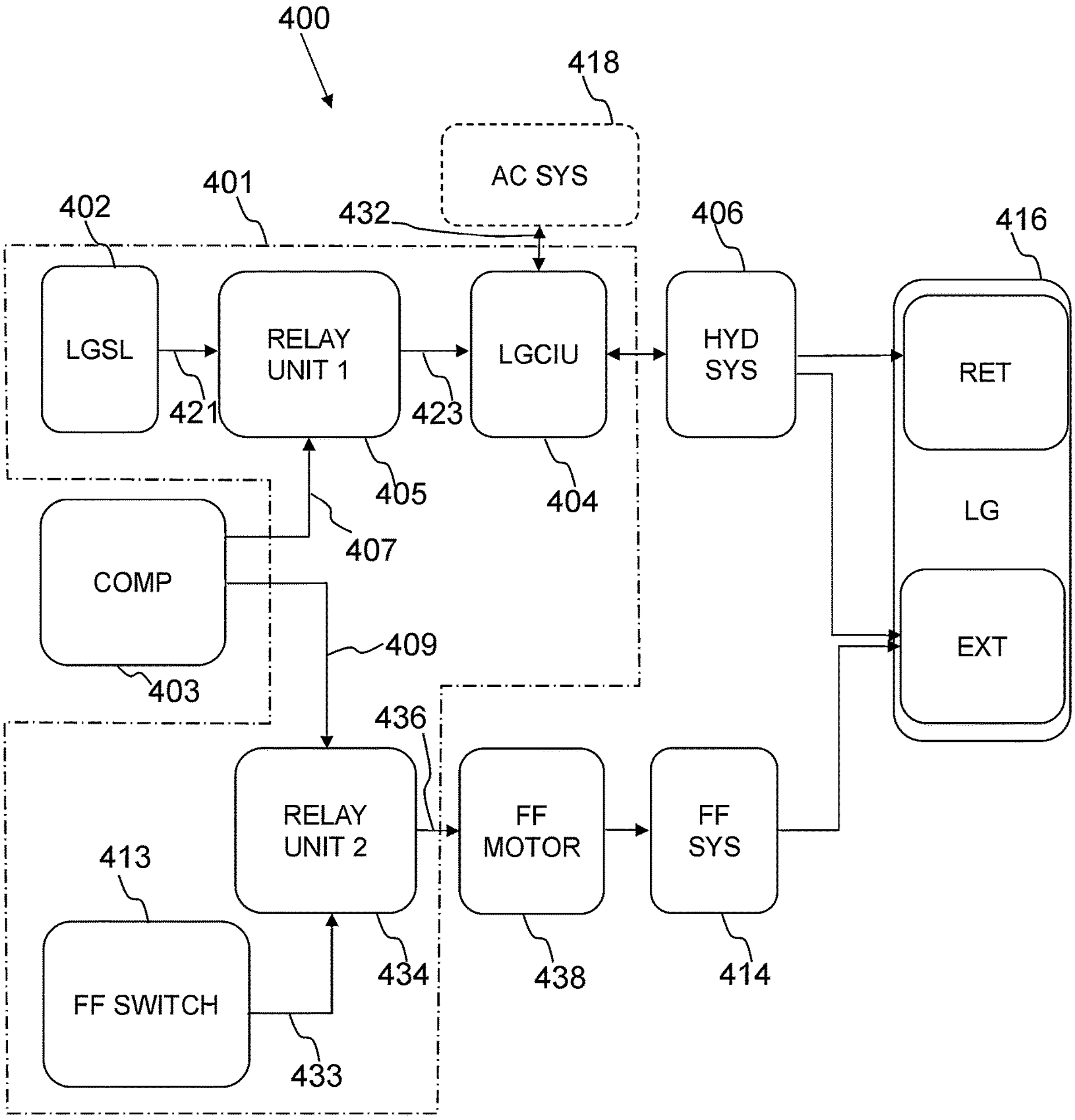
FIG. 8 shows an apparatus for use within an aircraft according to a second embodiment.

FIG. 8 shows an apparatus 400 for use within an aircraft according to a second embodiment of the present invention. The apparatus 400 is very similar to the apparatus 300 of the first embodiment. Features indicated by reference numerals 3XX in FIG. 6 are indicated by the same reference numeral beginning with a 4 in FIG. 8 (reference numerals will be formatted 4XX in FIG. 8). Only the significant differences between the first and second embodiments will now be described. The apparatus 400 includes a landing gear control system 401 and a free-fall landing gear extension electric motor 438. The landing gear control system 401 includes a first relaying unit 405, a second relaying unit 434 and a free-fall landing gear selector switch 413. In embodiments, the first relaying unit has been retrofitted to an existing landing gear control system of the aircraft. In embodiments, the second relaying unit has been retrofitted to an existing landing gear control system of the aircraft. The first relaying unit 405 is connected by a signal feed 421 to the LGSL 402 and by a signal feed 423 to the LGCIU 404. The first relaying unit 405 is connected by a signal feed 407 to the computer 403. The second relaying unit 434 is connected by a signal feed 409 to the computer 403. The second relaying unit 434 is connected by a signal feed 433 to the free-fall landing gear selector switch 413. The second relaying unit 434 is connected by a signal feed 436 to the free-fall landing gear extension electric motor 438. The free-fall landing gear extension electric motor 438 is configured to actuate the free-fall landing gear system 414 of the aircraft which can extend the landing gear 416. This may be as a replacement of the crank wheel (see FFCW 212 in FIG. 5 of the prior art) that would otherwise be present and manually turned by a pilot in order to cause a free-fall landing gear extension. Alternatively, the free-fall landing gear extension electric motor 438 could be configured to turn a pre-existing crank wheel. The LGCIU 404 is configured to output, on receipt of a command for landing gear extension from the first relaying unit 405, a gear-down command to the hydraulic landing gear system 406. If there is a fault with the hydraulic landing gear system 406, this will cause a fault signal to be sent to the computer 403 and a hydraulic landing gear system fault will also be indicated to the pilot in the cockpit (not shown in FIG. 8). The computer 403 is configured to output a command for landing gear extension (via signal feed 409) to the second relaying unit 434 when all of the following three conditions are satisfied: (i) it receives a fault signal from the hydraulic landing gear system 406; (ii) it is detected that pilot incapacitation has occurred; and (iii) when it is detected that landing gear extension is required. On receipt of the landing gear extension command from the computer 403, the second relaying unit 434 is configured to output a gear-down command (via signal feed 436) to the free-fall landing gear extension electric motor 438 which operates the free-fall landing gear system 414 of the aircraft to extend the landing gear 416.

The free-fall landing gear selector switch 413 is configured to be operable by a pilot of the aircraft to cause a command for landing gear extension to be sent to the second relaying unit 434 (via signal feed 433). On receipt of the command for landing gear extension, the second relaying unit 434 is configured to output a gear-down command. The free-fall landing gear system 414 is configured to extend the landing gear 416 of the aircraft using the free-fall landing gear extension electric motor 438 in response to receiving a gear-down command from the second relaying unit 434. The pilot of the aircraft would operate the free-fall landing gear selector switch 413 if a fault with the hydraulic landing gear system 406 became apparent to the pilot via a cockpit fault indicator.

Figure 9:
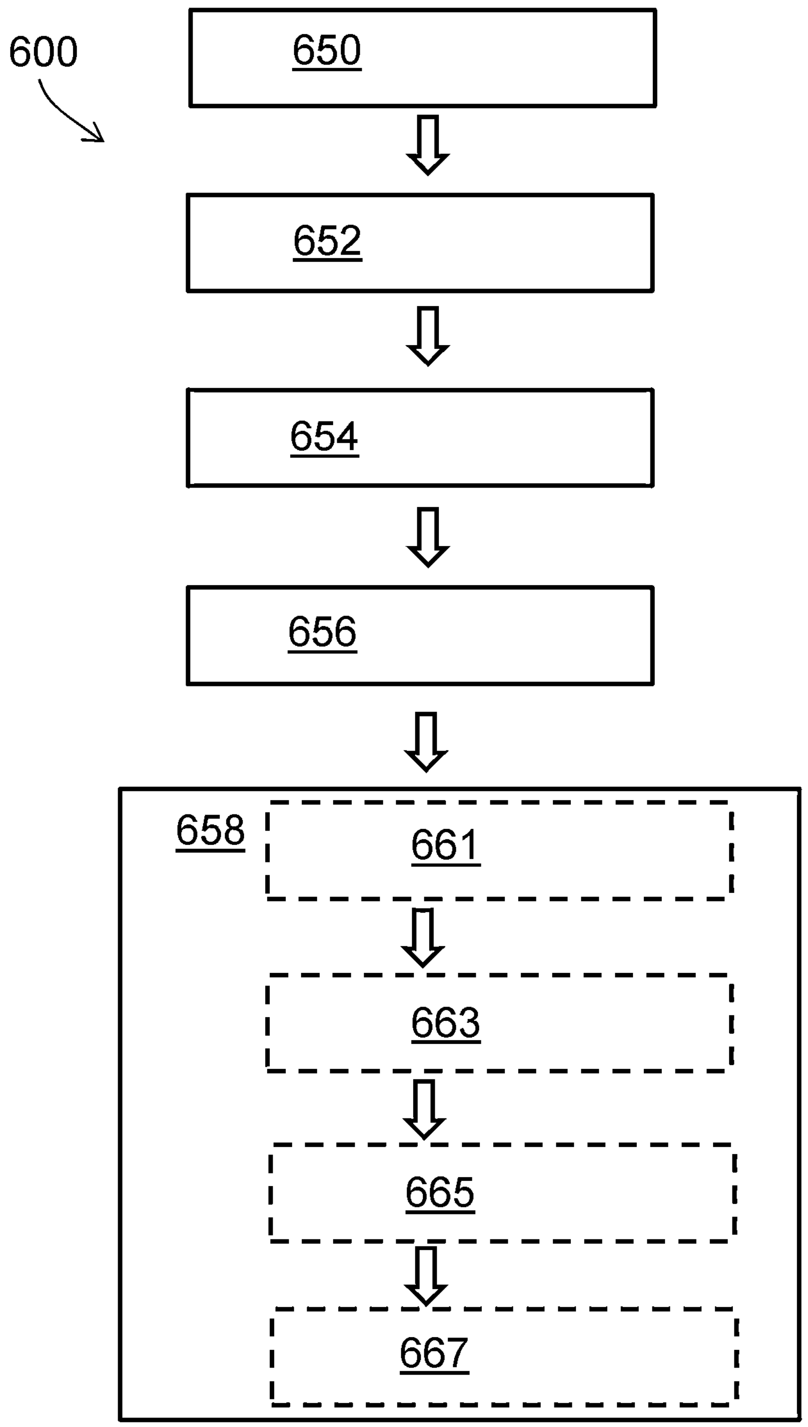
FIG. 9 shows a series of steps of a method that is performed when extending the landing gear of an aircraft having an apparatus in accordance with the second embodiment.

FIG. 9 shows a sequence of method steps 600 that are performed when extending the landing gear of an aircraft with an apparatus in accordance with the second embodiment. As a first step 650, the computer receives one or more signals indicating that pilot incapacitation has occurred or the computer detects pilot incapacitation. As a second step 652, the computer receives one or more signals indicating that landing gear extension is required or the computer detects that landing gear extension is required. Then, as a third step 654, in response to the first and second steps, the computer outputs a signal to the first relaying unit to command extension of the landing gear. As a fourth step 656, in response to the signal commanding extension of the landing gear, the first relaying unit outputs a gear-down command signal. As a fifth step 658, in response to the gear-down command signal, the landing gear of the aircraft is extended. The fifth step 658 of the landing gear of the aircraft being extended may comprise the following intermediary steps. As a first intermediary step 661, the hydraulic landing gear system of the aircraft outputs a fault signal indicating that there is a fault or failure in the hydraulic landing gear system that is preventing landing gear extension. As a second intermediary step 663, the computer receives the fault signal and outputs a signal to the second relaying unit to command the extension of the landing gear. As a third intermediary step 665, in response to the signal commanding extension of the landing gear, the second relaying unit outputs a gear-down command to the free-fall landing gear extension electric motor. As a fourth intermediary step 667, the free-fall landing gear extension electric motor operates the free-fall landing gear system to extend the landing gear of the aircraft.

Figure 10:
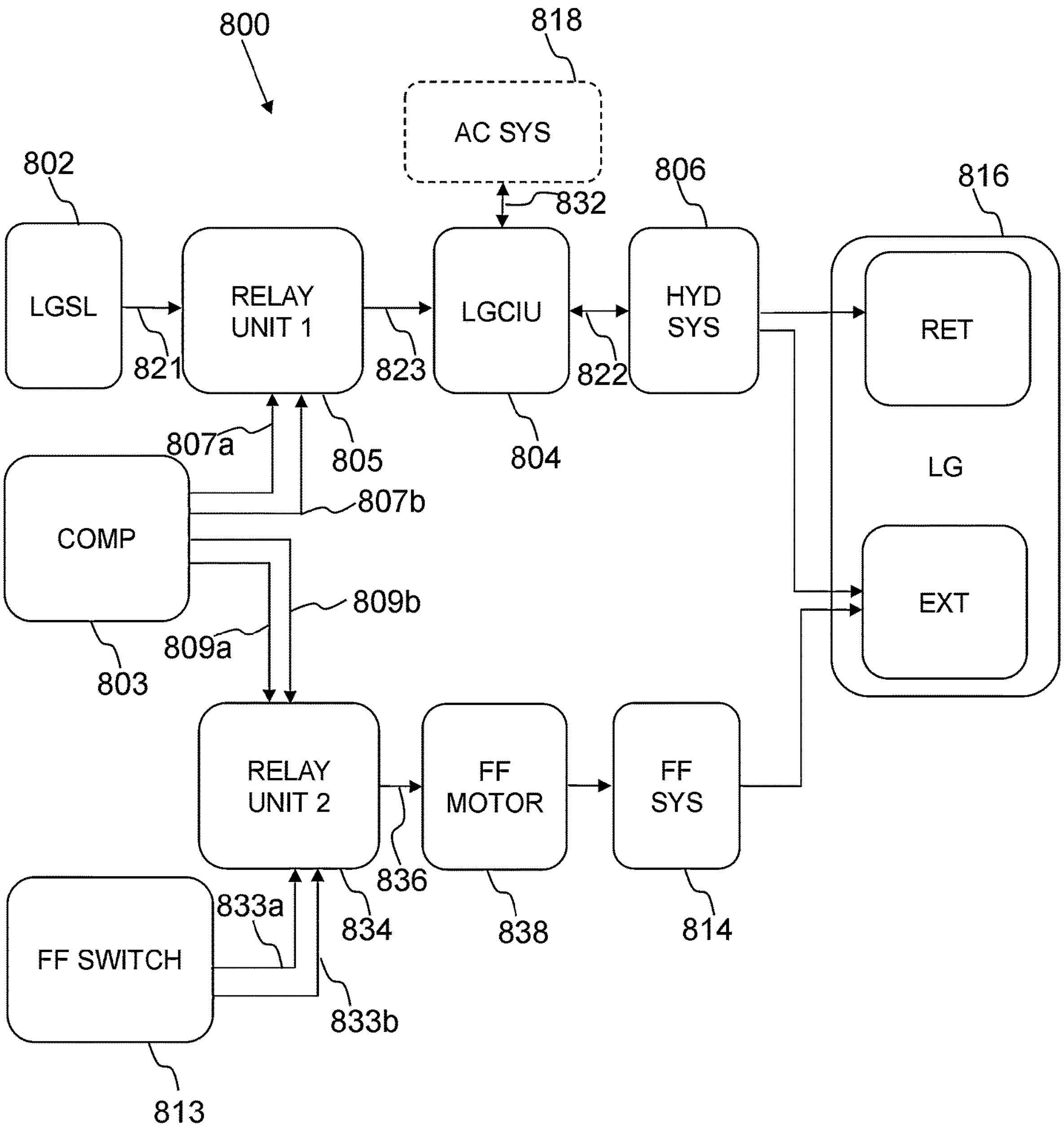
FIG. 10 shows an apparatus for use within an aircraft according to a third embodiment.

FIG. 10 shows an apparatus 800 for use within an aircraft according to a third embodiment of the present invention. The apparatus 800 is very similar to the apparatus 400 of the second embodiment. Features indicated by reference numerals 4XX in FIG. 8 are indicated by the same reference numeral beginning with an 8 in FIG. 10 (reference numerals will be formatted 8XX in FIG. 10). Only the significant differences between the second and third embodiments will now be described. The first relaying unit 805 is connected by a primary signal feed 807*a* and a secondary signal feed 807*b* to the computer 803. The second relaying unit is connected by a primary signal feed 809*a* and a secondary signal feed 809*b* to the computer 803. The second relaying unit 834 is connected by a primary signal feed 833*a* and a secondary signal feed 833*b* to the free-fall landing gear selector lever 813. The LGCIU 804 is configured to output, on receipt of a command (via signal feed 823) for landing gear extension/retraction from the first relaying unit 805, a gear-down/gear-up command (via signal feed 822) to the hydraulic landing gear system 806. On receipt of the gear-down/gear-up command the hydraulic landing gear system 806 is configured to perform a sequence of steps for extending/retracting the landing gear 816. The first relaying unit 805 is configured to output a command for landing gear extension/retraction to the LGCIU 804 in response to the pilot of the aircraft operating the LGSL 802 (which sends a signal via signal feed 821). The first relaying unit 805 is also configured to output a command for landing gear extension/retraction to the LGCIU 804 in response to the computer 803 outputting both a first command signal for landing gear extension/retraction via signal feed 807*a* and the computer 803 outputting a second command signal for landing gear extension/retraction via signal feed 807*b*. The computer 803 is configured to output a first command for landing gear extension and a second command for landing gear extension to the first relaying unit 805 when both of the following conditions are satisfied: (i) it is detected that pilot incapacitation has occurred; and (ii) when it is detected that landing gear extension is required. The first relaying unit 805 requiring both a first command signal and a second command signal before outputting a command for landing gear extension/retraction to the LGCIU 804 improves the robustness of the aircraft system, as there is less likely to be an undesirable extension/retraction of the landing gear due to an individual signal failure.

The computer 803 is configured to output a first command for landing gear extension via signal feed 809*a* and a second command for landing gear extension via signal feed 809*b* to the second relaying unit 834 when all three of the following conditions are satisfied: (i) it receives a fault signal from the hydraulic landing gear system 806; (ii) it is detected that pilot incapacitation has occurred; and (iii) when it is detected that landing gear extension is required. On receipt of the first and second landing gear extension command signals from the computer 803, the second relaying unit 834 is configured to output a gear-down command (via signal feed 836) to the free-fall landing gear extension electric motor 838 which operates the free-fall landing gear system 814 to extend the landing gear 816. By requiring both a first and a second command signal for landing gear extension from the computer 803, the robustness of the system is improved, as there is improved redundancy by not relying on an individual signal to cause extension of the landing gear. Such first and second signals both being required to cause extension and/or retraction of the landing gear may be implemented with a COM/MON signaling regime—i.e., as in a command/monitor system.

If the pilot operates the free-fall landing gear selector switch 813 to extend the landing gear of the aircraft, the free-fall landing gear selector switch 813 outputs a first landing gear extension command signal via signal feed 833*a* and a second landing gear extension command signal via signal feed 833*b*. On receipt of the first and second landing gear extension command signals from the free-fall landing gear selector switch 813, the second relaying unit 834 is configured to output a gear-down command (via signal feed 836) to the free-fall landing gear extension electric motor 838 which operates the free-fall landing gear system 814 to extend the landing gear 816. By requiring both a first and a second command signal for landing gear extension from the free-fall landing gear selector switch 813 the robustness of the second relaying unit 834 is increased, as explained above.

Figure 11:
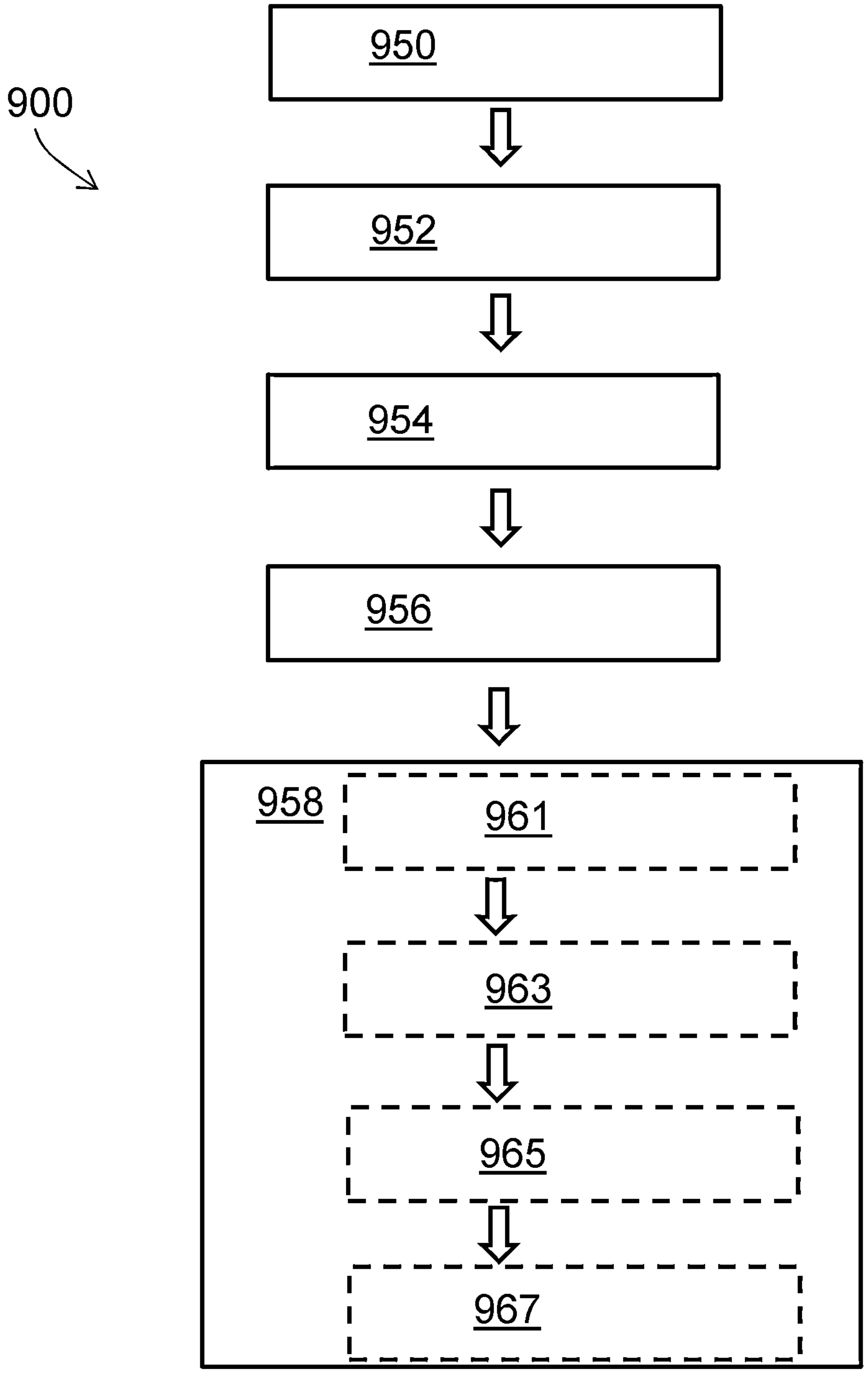
FIG. 11 shows a series of steps of a method that is performed when extending the landing gear of an aircraft having an apparatus in accordance with the third embodiment.

FIG. 11 shows a sequence of method steps 900 that are performed when extending the landing gear of an aircraft having an apparatus in accordance with the third embodiment. As a first step, 950 the computer receives one or more signals indicating that pilot incapacitation has occurred. As a second step 952, the computer receives one or more signals indicating that landing gear extension is required. Then, as a third step 954, in response to the first and second steps, the computer outputs both a primary signal to the first relaying unit to command extension of the landing gear and a secondary signal to the first relaying unit to command extension of the landing gear. As a fourth step 956, in response to receiving both the primary signal and the secondary signal commanding extension of the landing gear, the first relaying unit outputs a gear-down command signal. As a fifth step 958, in response to the gear-down command signal, the landing gear of the aircraft is extended. The fifth step 958 of the landing gear of the aircraft being extended may comprise the following intermediary steps. As a first intermediary step 961, the hydraulic landing gear system of the aircraft outputs a fault signal indicating that there is a fault or failure in the hydraulic landing gear system that is preventing landing gear extension. As a second intermediary step 963, the computer receives the fault signal and outputs both a primary signal and a secondary signal to the second relaying unit to command the extension of the landing gear. As a third intermediary step 965, in response to receiving both the primary signal and the secondary signal commanding extension of the landing gear, the second relaying unit outputs a gear-down command to the free-fall landing gear extension electric motor. As a fourth intermediary step 967, the free-fall landing gear extension electric motor operates the free-fall landing gear system to extend the landing gear of the aircraft.

Figure 12:
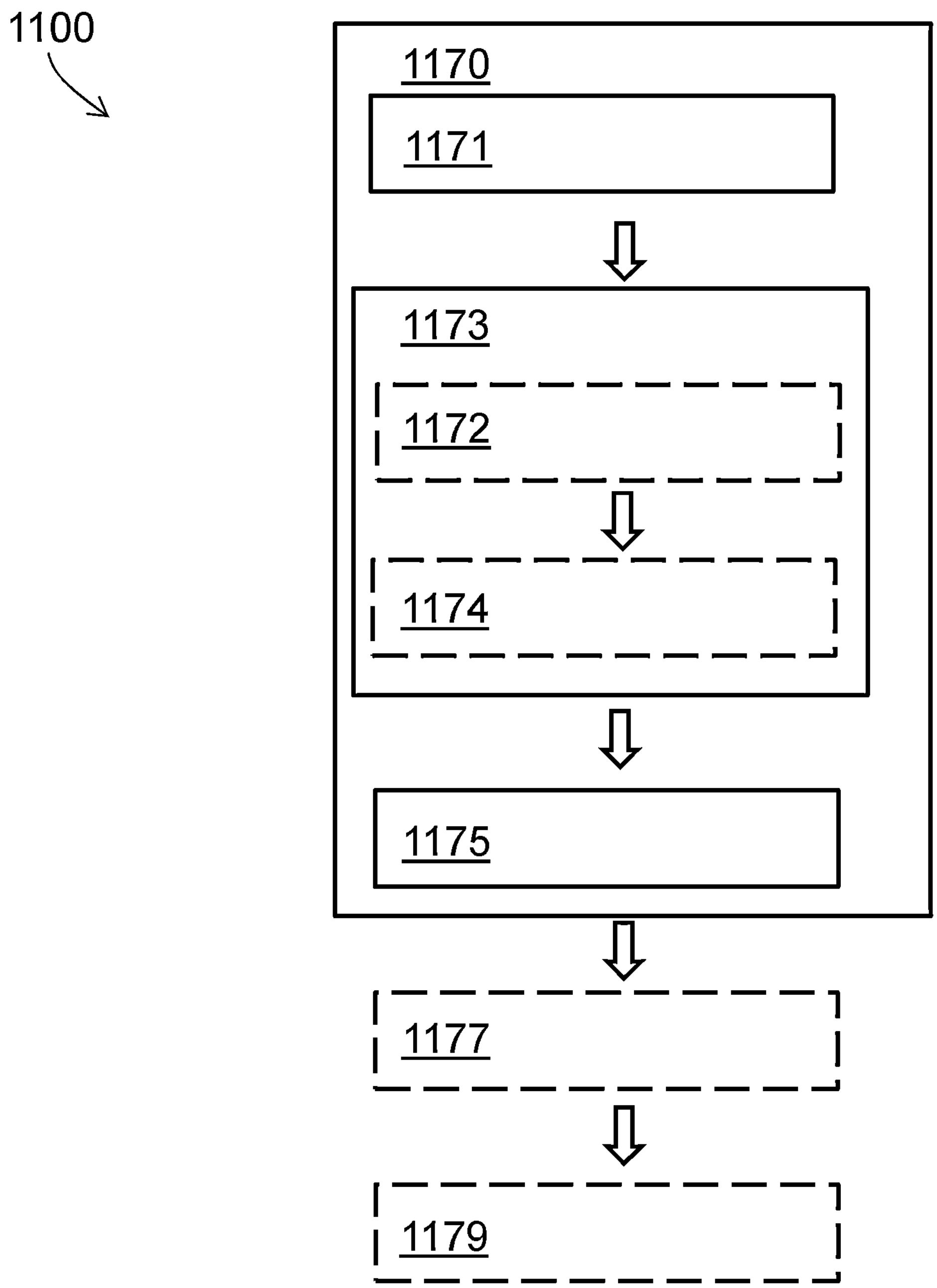
FIG. 12 shows a series of steps of a method of converting an existing aircraft (the existing aircraft having an apparatus as shown in FIG. 5).

One benefit of the above described embodiments is that they may readily be retrofitted to an existing aircraft, with little change to manual pilot operations. The use of a relaying unit in between pilot and landing gear system may be transparent to the pilot yet facilitate automation of the landing gear in the event of pilot incapacitation—thus enabling the conversion of an existing aircraft to facilitate single pilot operation. FIG. 12 shows a sequence of steps of a method 1100 of converting an existing aircraft in such a way. The existing aircraft comprising an extendible landing gear, a computer and a landing gear control system. The landing gear control system comprising a landing gear control unit and a landing gear lever. The existing aircraft being configured to extend or retract its landing gear in response to pilot operation of the landing gear lever. The method 1100 comprises a first step 1170 of integrating a first relaying unit into the landing gear control system. The first step 1170, comprising the following intermediary steps. As a first intermediary step 1171, providing a signal feed from the landing gear lever to the first relaying unit. As a second intermediary step 1173, providing a signal feed from the computer to the first relaying unit. As a third intermediary step 1175, providing a signal feed from the first relaying unit to the landing gear control unit. In embodiments, the second intermediary step 1173 of providing a signal feed from the computer to the first relaying unit comprises two additional steps. As a first additional step 1172, providing a primary signal feed from the computer to the first relaying unit. As a second additional step 1174, providing a secondary signal feed from the computer to the first relaying unit. In further embodiments, the method 1100 further comprises a second step 1177 of integrating a second relaying unit into the landing gear control system for use in causing freefall landing gear extension. In further embodiments, the method 1100 further comprises a third step 1179 of replacing a manually operated freefall landing gear extension mechanism on the existing aircraft with an electrical freefall landing gear extension mechanism.

The systems and devices described herein may include a controller, control unit, control device, controlling means, system control, processor, computing unit or a computing device comprising a processing unit and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

While the present invention has been described and illustrated with reference to particular embodiments, it will be appreciated by those of ordinary skill in the art that the invention lends itself to many different variations not specifically illustrated herein. By way of example only, certain possible variations will now be described.

Pilot incapacitation may be detected by various different means, including those not described above. Pilot incapacitation may be detected either before or after the need to extend a landing gear is determined. The need to extend a landing gear may use (or depend, at least in part on) a signal that already exists on the aircraft, for example a "landing gear not down" warning signal and/or "landing gear not locked and down" signal. The particular phase of flight of the aircraft may be used to determine when the landing gear should be moved (extended/retracted). There may be five or more such distinct flight phases that the aircraft systems distinguish between.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments. The term 'or' shall be interpreted as 'and/or' unless the context requires otherwise.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft including:

an extendible landing gear, and a landing gear control system, the landing gear control system comprising:

a landing gear control unit, a pilot operated landing gear input device, and a first relaying unit, the landing gear control system being (a) configured to extend the landing gear of the aircraft in response to pilot operation of the pilot operated landing gear input device causing a command to be sent to the first relaying unit and passed from the first relaying unit to the landing gear control unit which then causes the landing gear to be extended, (b) configured to extend the landing gear of the aircraft when incapacitation of the pilot of the aircraft is detected, in response to a command sent to the first relaying unit and passed from the first relaying unit to the landing gear control unit which then causes the landing gear to be extended, (c) configured to retract the landing gear of the aircraft in response to pilot operation of the pilot operated landing gear input device causing a command to be sent to the first relaying unit and passed from the first relaying unit to the landing gear control unit which then causes the landing gear to be retracted, and (d) configured to retract the landing gear of the aircraft when incapacitation of the pilot of the aircraft is detected, in response to a command sent to the first relaying unit and passed from the first relaying unit to the landing gear control unit which then causes the landing gear to be retracted.

2. The aircraft according to claim 1, wherein the aircraft includes a hydraulic landing gear extension and retraction system, and a freefall landing gear extension system that includes an electric motor; and the landing gear control system includes a second relaying unit and a pilot operated freefall landing gear input device, wherein the freefall landing gear extension system is configured to extend the landing gear of the aircraft using the electric motor (e) in response to pilot operation of the pilot operated freefall landing gear input device, and (f) when both incapacitation of the pilot of the aircraft is detected and a fault with the hydraulic landing gear extension and retraction system is detected, in response to a command sent to the second relaying unit and passed from the second relaying unit to the freefall landing gear extension system.

3. The aircraft according to claim 2, wherein the second relaying unit has been retrofitted to an existing landing gear control system of the aircraft.

4. The aircraft according to claim 1, wherein the first relaying unit has been retrofitted to an existing landing gear control system of the aircraft.

5. An aircraft including:

an extendible landing gear;

a pilot operated freefall landing gear input device;

a freefall landing gear system that includes an electric motor;

wherein the freefall landing gear system is configured to extend the landing gear of the aircraft using the electric motor in response to pilot operation of the pilot operated freefall landing gear input device causing a gear-down command to be sent to the electric motor; and, a relaying unit, wherein the freefall landing gear system is also configured to extend the landing gear of the aircraft using the electric motor when incapacitation of the pilot of the aircraft is detected, in response to a command sent to the relaying unit and passed from the relaying unit to the electric motor.

6. An aircraft including:

an extendible landing gear, a landing gear control system, the landing gear control system comprising:

a landing gear control unit, a pilot operated landing gear input device, a first relaying unit, a second relaying unit, and a pilot operated freefall landing gear input device a hydraulic landing gear extension and retraction system, and a freefall landing gear extension system that includes an electric motor, the landing gear control system being (a) configured to extend the landing gear of the aircraft in response to pilot operation of the pilot operated landing gear input device causing a command to be sent to the first relaying unit and passed from the first relaying unit to the landing gear control unit which then causes the landing gear to be extended, and (b) configured to extend the landing gear of the aircraft when incapacitation of the pilot of the aircraft is detected, in response to a command sent to the first relaying unit and passed from the first relaying unit to the landing gear control unit which then causes the landing gear to be extended; and the freefall landing gear extension system is configured to extend the landing gear of the aircraft using the electric motor (c) in response to pilot operation of the pilot operated freefall landing gear input device, and (d) when both incapacitation of the pilot of the aircraft is detected and a fault with the hydraulic landing gear extension and retraction system is detected, in response to a command sent to the second relaying unit and passed from the second relaying unit to the freefall landing gear extension system.

7. The aircraft according to claim 6, wherein the second relaying unit has been retrofitted to an existing landing gear control system of the aircraft.

* * * * *